US012530013B2

(12) United States Patent
Asadi-Zanjani et al.

(10) Patent No.: US 12,530,013 B2
(45) Date of Patent: Jan. 20, 2026

(54) DIGITAL TWIN MODELING OF IC PACKAGING STRUCTURE

(71) Applicant: University of Florida Research Foundation, Incorporated, Gainesville, FL (US)

(72) Inventors: Navid Asadi-Zanjani, Gainesville, FL (US); John True, Gainesville, FL (US); Chengjie Xi, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 588 days.

(21) Appl. No.: 18/054,623

(22) Filed: Nov. 11, 2022

(65) Prior Publication Data
US 2023/0185274 A1 Jun. 15, 2023

Related U.S. Application Data

(60) Provisional application No. 63/286,592, filed on Dec. 7, 2021.

(51) Int. Cl.
*G05B 19/4097* (2006.01)
(52) U.S. Cl.
CPC .......... *G05B 19/4097* (2013.01); *G05B 2219/35134* (2013.01); *G05B 2219/45034* (2013.01)
(58) Field of Classification Search
CPC ...... G05B 19/4097; G05B 2219/35134; G05B 2219/45034; G06F 30/398; G06F 2111/10; G06F 2113/18
(Continued)

(56) References Cited

U.S. PATENT DOCUMENTS 8,139,846 B2 3/2012 Bajura et al.
10,783,612 B2 9/2020 Ahi
(Continued)

FOREIGN PATENT DOCUMENTS

| CN | 106599433 A | * | 4/2017 | ........... G06F 30/398 |
| KR | 20160108458 A | * | 9/2016 | ............ H01J 37/265 |
| TW | 202046248 A | * | 12/2020 | ............... G06T 7/00 |

OTHER PUBLICATIONS

E. Principe, et al., "Steps toward automated deprocessing of integrated circuits", ISTFA™ 2017: Proceedings from the 43rd International Symposium for Testing and Failure Analysis Nov. 5-9, 2017 (Year: 2017).*

*Primary Examiner* — Thomas C Lee
*Assistant Examiner* — Michael Tang
(74) *Attorney, Agent, or Firm* — ALSTON & BIRD LLP

(57) ABSTRACT

Various embodiments are directed to analysis of three-dimensional structure of an integrated circuit (IC) sample in order to enable sample preparation for physical inspection and hardware assurance. Specifically, various embodiments provide a structural analysis framework that enables high-quality sample preparation, including careful material removal of IC packaging material without damaging internal components of the IC sample. In various embodiments, the structural analysis framework involves receiving a digital twin model of an IC sample, and the digital twin model may be generated using X-ray CT imaging. Then, various regions of interest of the IC sample may be identified and selected via the digital twin model. The structural analysis framework further includes performing THz-TDS to collect ultra-high-resolution thickness information at the regions of interest. Both the digital twin model and the ultra-high-resolution thickness information may then be used to guide material removal of the IC sample.

15 Claims, 8 Drawing Sheets

(58) Field of Classification Search
USPC .......................................................... 700/98
See application file for complete search history.

(56) References Cited

U.S. PATENT DOCUMENTS

| | | | |
|---|---|---|---|
| 11,030,737 | B2 | 6/2021 | Tehranipoor et al. |
| 2014/0233844 | A1* | 8/2014 | Amzaleg ................. G06T 7/001 |
| | | | 382/149 |
| 2021/0038111 | A1 | 2/2021 | Ahi |
| 2021/0264082 | A1* | 8/2021 | Tehranipoor ............ G06F 30/20 |
| 2022/0230841 | A1* | 7/2022 | Davies .................. H01J 37/228 |
| 2022/0324064 | A1* | 10/2022 | Antaya ................... C22C 13/00 |
| 2023/0077838 | A1* | 3/2023 | Asadi-Zanjani ... G01N 21/3586 |
| | | | 250/341.8 |

* cited by examiner

DIGITAL TWIN MODELING OF IC PACKAGING STRUCTURE

CROSS-REFERENCE TO A RELATED APPLICATION

This application claims the benefit of U.S. Provisional Application Ser. No. 63/286,592, filed Dec. 7, 2021, the disclosure of which is hereby incorporated by reference in its entirety, including all figures, tables and drawings.

TECHNOLOGICAL FIELD

Embodiments of the present disclosure generally relate to analysis of integrated circuit (IC) structure, and in particular, modeling IC samples to enable high-quality sample preparation and material removal before physical inspection of the IC samples.

BACKGROUND

Increased outsourcing of integrated circuit (IC) design and fabrication combined with malicious hardware security threats such as contactless optical probing have greatly increased an attacker's ability to reverse engineer or maliciously modify a given circuit. This has become a significant concern for the safety and security of the semiconductor industry. Physical inspection techniques can be used to validate IC hardware integrity and detect security threats to address these concerns. However, most physical inspection methods for ICs rely upon removing unwanted epoxy packaging material without damaging the device under test (DUT). Therefore, the precise removal of IC packaging is critical for successful performance of physical inspection of ICs. Currently, IC packaging removal can be guided through IC structure analysis, which depends on using techniques such as high-resolution X-ray computed tomography (CT) imaging and/or X-ray computed laminography (CL) imaging. However, both X-ray CT imaging and X-ray CL imaging are limited in their ability to capture structural data accurately in all three dimensions simultaneously. High-resolution X-ray CT imaging is time-consuming and lacks the spatial resolution necessary for characterizing advanced heterogeneous packages, and while X-ray CL is able to achieve high spatial resolution of objects on the X-Y plane, it lacks accuracy of depth on the Z-axis. For hardware assurance purposes, the entire volume of a device must be analyzed with high efficacy. Additionally, various packaging and recently adopted 2.5D and 3D advanced packages bring more challenges to physical inspection and hardware assurance.

BRIEF SUMMARY

Generally, various embodiments of the present disclosure employ hybrid metrology, which involves the combined use of inspection methods for characterization, to address various technical challenges relating to physical inspection and hardware assurance of ICs, including ICs having advanced packaging. Various embodiments provide a hybridized inspection framework that utilizes both non-destructive THz-TDS imaging and X-ray CT imaging of an IC sample in generating an ultra-high-resolution digital twin (DT) model of the IC sample, including the IC packaging. In various embodiments, the hybridized characterization of the IC sample and IC packaging can be leveraged to improve the efficiency and accuracy for high quality sample preparation for physical inspection and hardware assurance. Hybrid imaging and DT model generation, further paired with automated sample preparation, can reduce the time and operator input needed for complete verification of a large volume of IC samples.

Specifically, various embodiments introduce a framework for generating a digital twin model of internal regions of interest (ROI) of the IC sample. Analysis of the generated digital twin model can be used to optimize the material removal necessary for physical inspection (referred interchangeably herein as IC verification, hardware assurance, and/or the like) at the ROIs of the IC sample without damaging the ROIs, in various embodiments. This inspection and removal methodology can be automated using boundary conditions obtained from the design information of the IC sample. Hybrid inspection provides the high spatial resolution thickness and geometry information for generating an automated material removal routine. Thus, various embodiments enable access to the IC sample's ROI for further FIB plasma delayering and SEM verification.

BRIEF DESCRIPTION OF THE DRAWINGS

Having thus described the present disclosure in general terms, reference will now be made to the accompanying drawings, which are not necessarily drawn to scale.

Figure 1C:
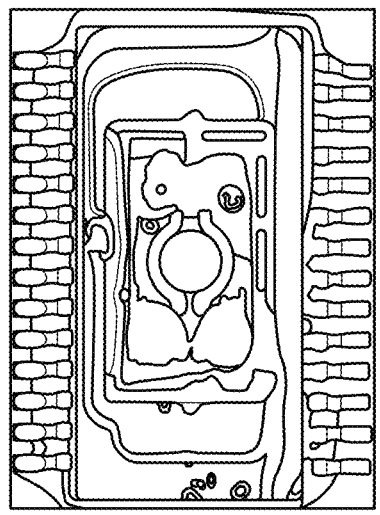
Figure 1B:
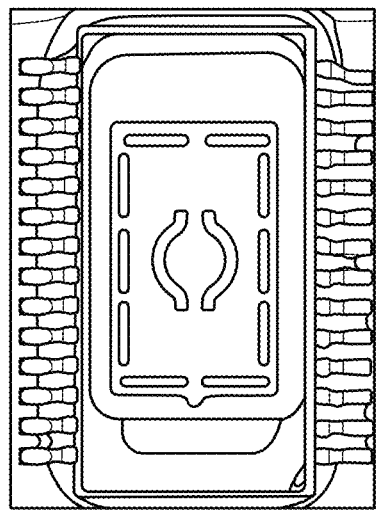
Figure 1A:
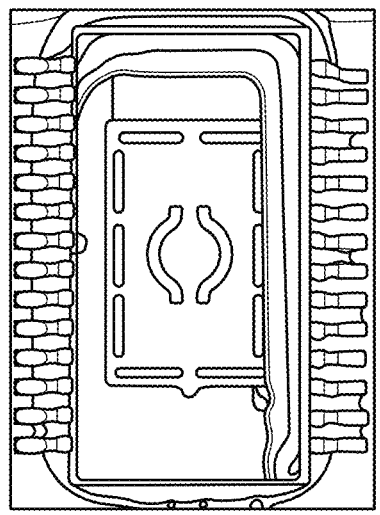

FIGS. 1A-C provide optical images of an example integrated circuit (IC) with different degrees of delayering.

Figure 2B:
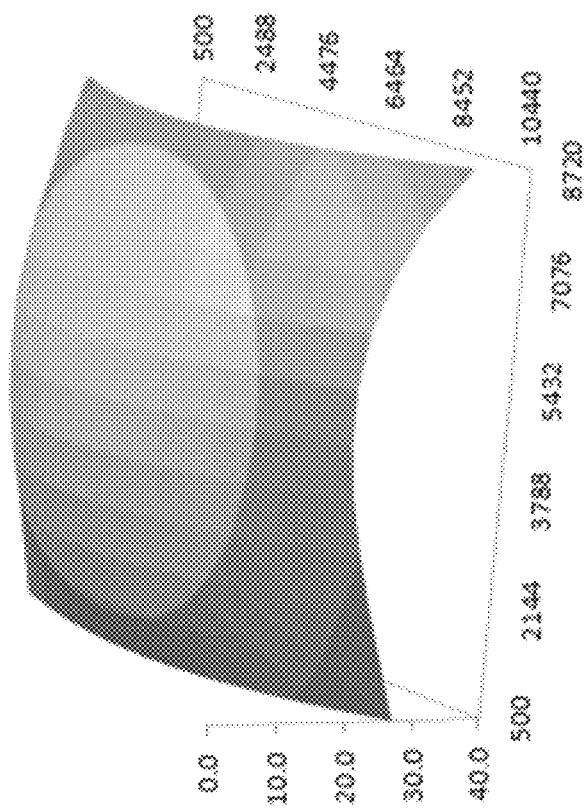
Figure 2A:
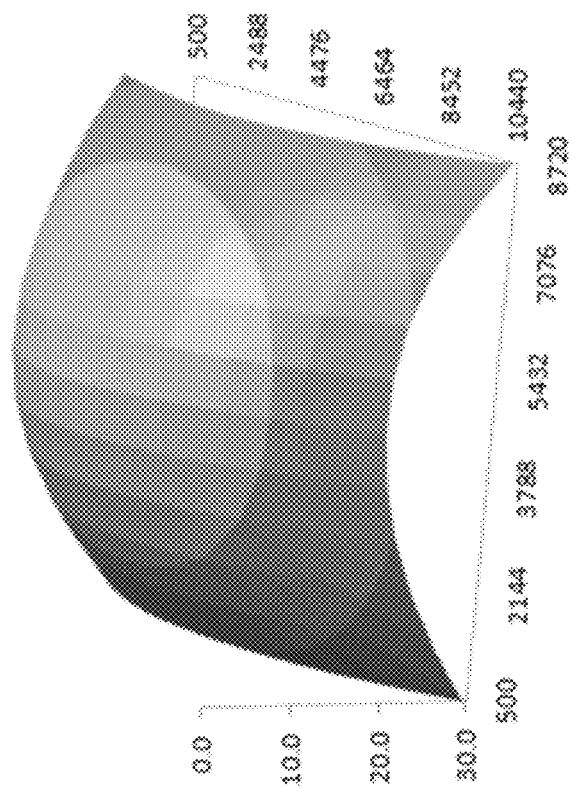

FIGS. 2A-B illustrate example plots describing die curvature profiles with different degrees of delayering.

Figure 3C:
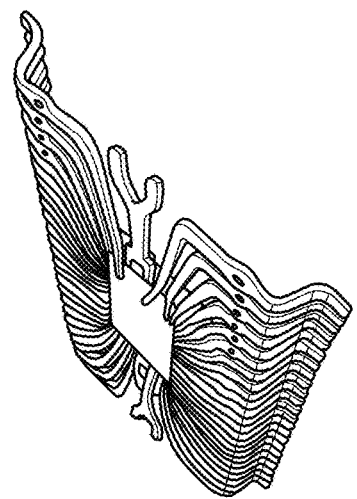
Figure 3B:
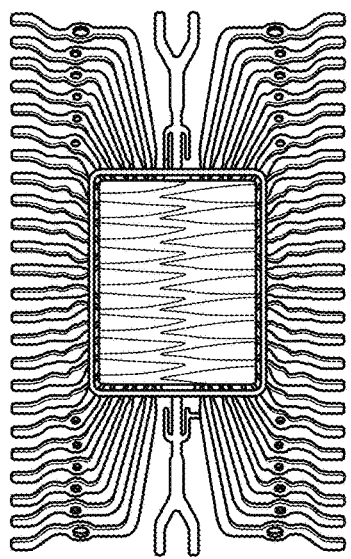
Figure 3A:
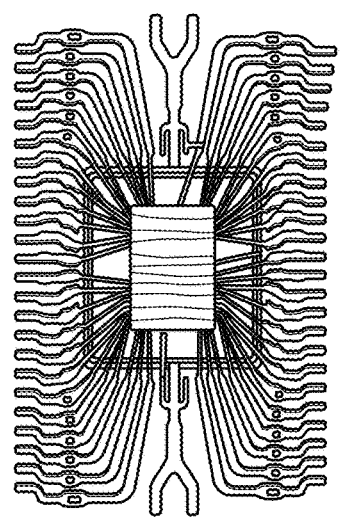

FIGS. 3A-C provide X-ray computed tomography (CT) models of an example IC after threshold removal of epoxy packaging.

Figure 4A:
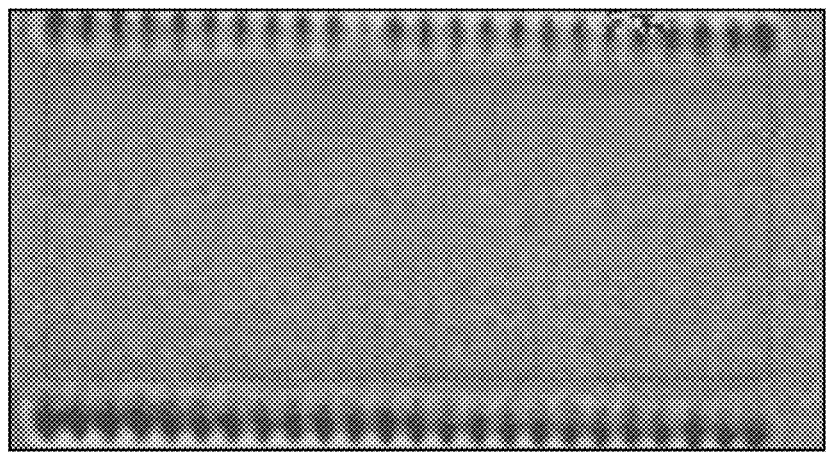
Figure 4B:
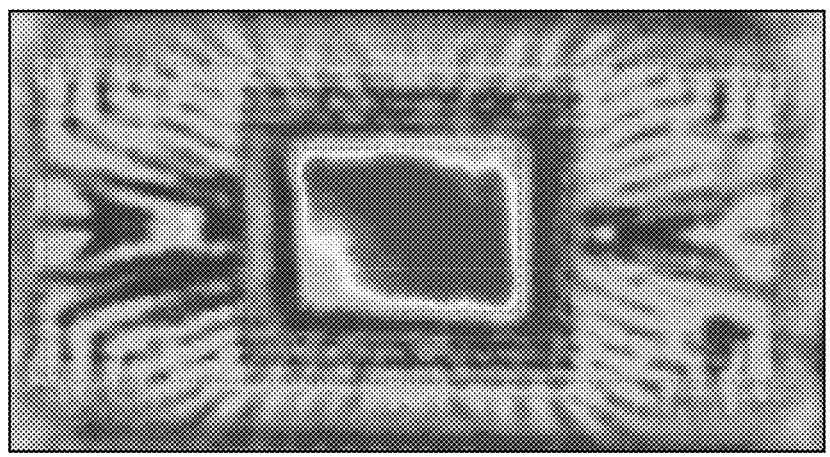
Figure 4C:
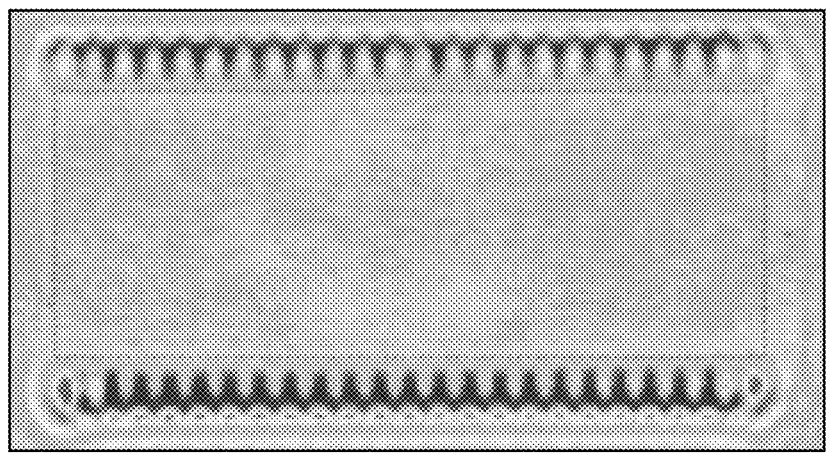

FIGS. 4A-C provide terahertz-time-domain-spectroscopy (THz-TDS) images from different layers of packaging for an example IC.

Figure 5:
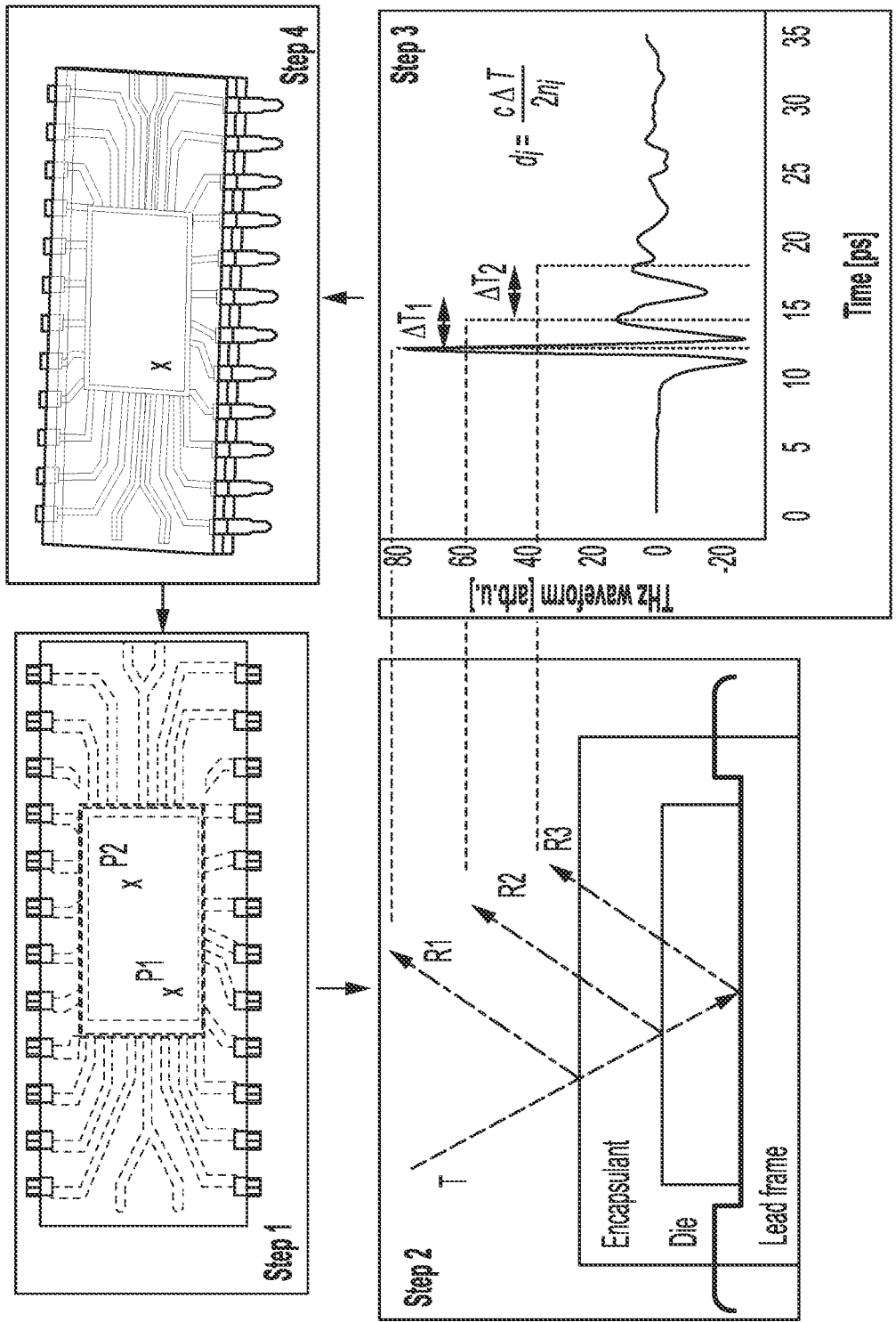

FIG. 5 provides an overview diagram illustrating example operations for providing structural analysis of an IC sample through a digital twin model to enable high-quality material removal and IC sample preparation for physical inspection, in accordance with various embodiments of the present disclosure.

Figure 6:
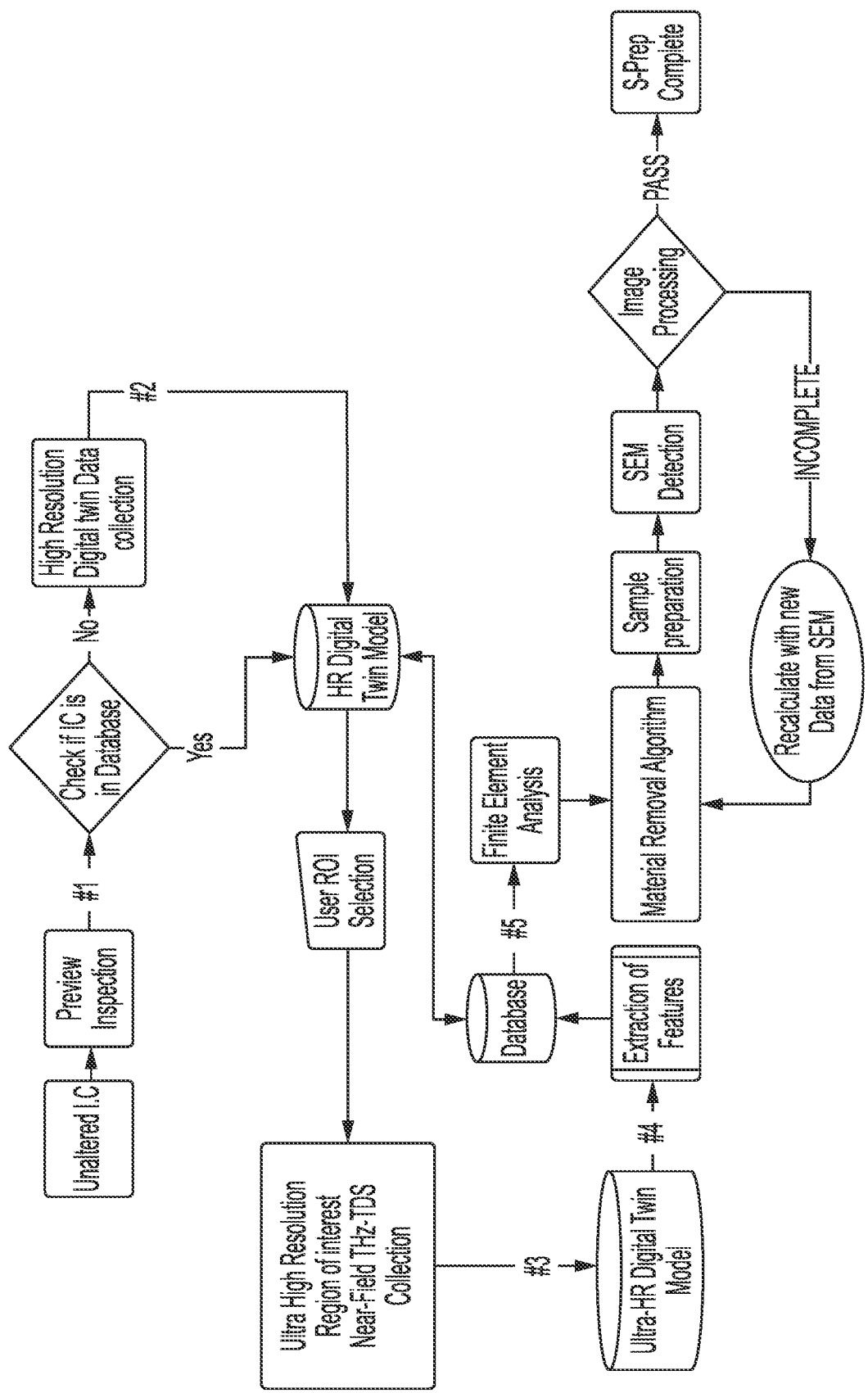

FIG. 6 illustrates a flowchart providing example operations for providing structural analysis of an IC sample through a digital twin model to enable high-quality material removal and IC sample preparation for physical inspection, in accordance with various embodiments of the present disclosure.

Figure 7:
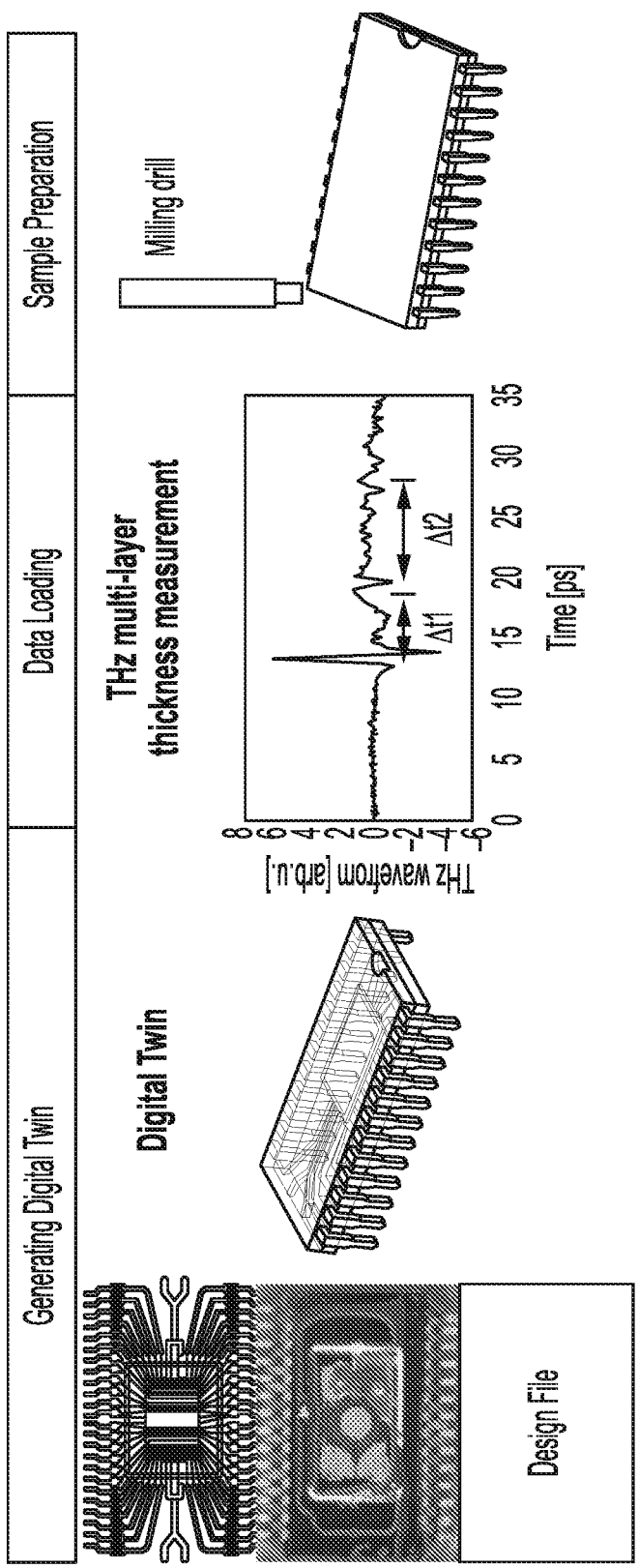

FIG. 7 provides an overview diagram illustrating example applications and integration of IC structure analysis and inspection using digital twin models, in accordance with various embodiments of the present disclosure.

Figure 8:
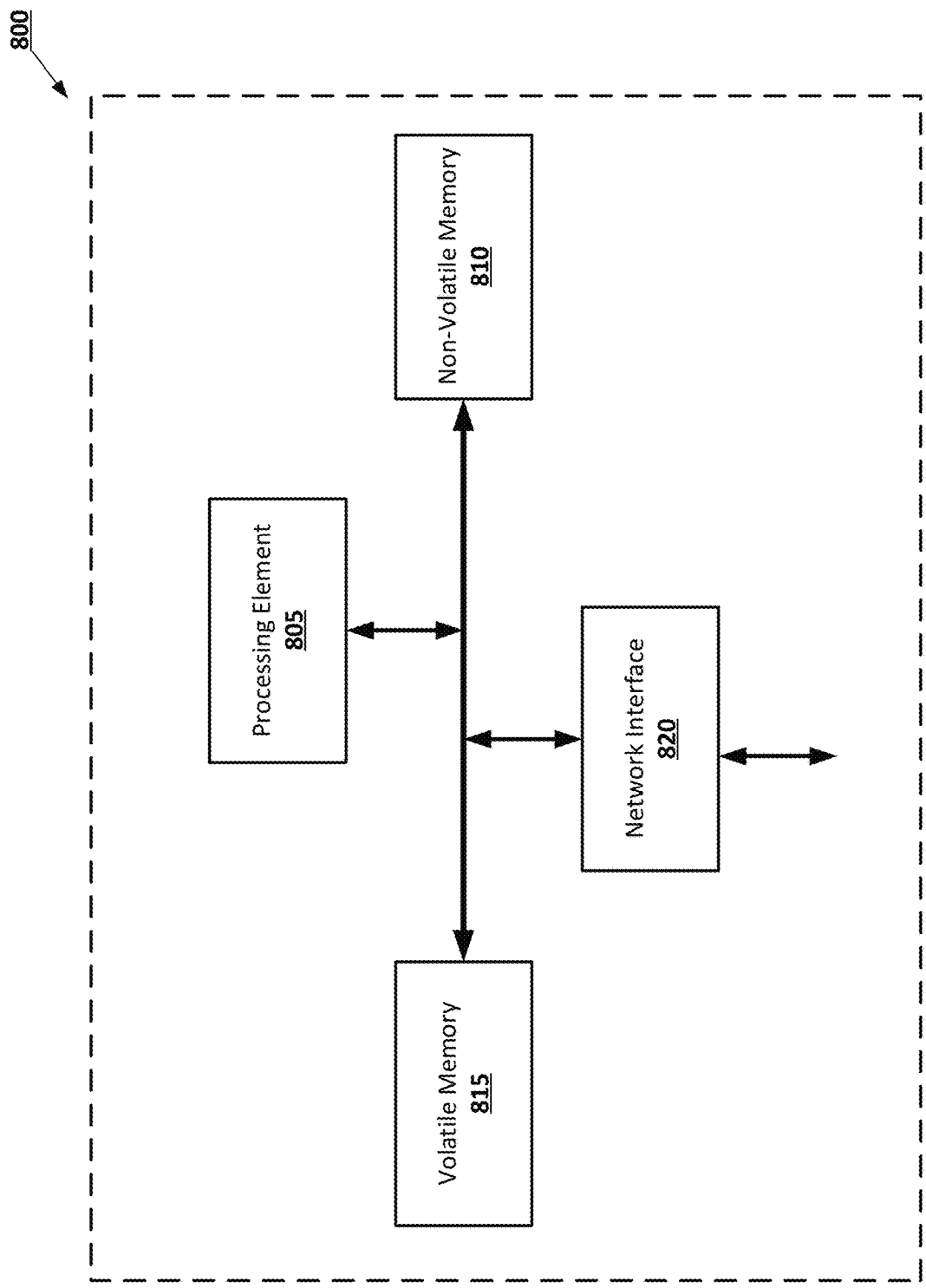

FIG. 8 provides a schematic diagram of a computing entity that may be used in accordance with various embodiments of the present disclosure.

DETAILED DESCRIPTION OF SOME EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW AND EXEMPLARY TECHNICAL ADVANTAGES

There is an increased amount of outsourced design and fabrication of integrated circuits (ICs) to untrusted facilities, which results in hardware assurance problems such as IC integrity and authentication. Different inspection methods have been used for hardware assurance purposes, such as Scanning Electron Microscope (SEM) imaging, electrical probing, optical probing, and more. Because of the physical limitation of various inspection methods (signal scattering, energy attenuation/absorption, surface roughness), sample preparation (also referred herein as s-prep) is needed to remove a certain amount of unwanted material and generate a uniformly flat surface. As a result, s-prep can be considered step 0 for IC validation for hardware assurance and physical analysis.

Since various applications require tradeoffs in different areas, multiple IC s-prep methods have been developed. Computer numerical control (CNC) based milling/polishing is a machining process that uses a precise computerized controlled tool to remove material on a micrometer to millimeter area scale. This method can enable uniform removal of approximately 10-100 nm of thinning material. Parallel lapping is most often used for silicon die delayering, but it can also be used on thin printed circuit boards (PCBs), compound semiconductors, and other IC packaging materials. It allows precise, semi-automatic grinding/polishing to remove a package, followed by silicon thinning to achieve the desired remaining silicon. Mechanical polishing following parallel lapping provides controlled material removal with a tolerance of approximately 1-5 um of gradient on a silicon surface. Chemical-based wet etching uses liquid chemicals to remove material and is also referred to as wet etching. For the purposes of s-prep, it is important to know and understand the material's etching rate. The etching rate also depends on many environment variables such as time, heat, light, and surface morphology, which makes it very difficult to control the remaining silicon for chemical-based wet etching. Dry etching or plasma etching uses plasma to transforms a solid into gas for material removal purpose. Plasma focused ion beam (FIB) delayering is the most advanced automated ultra-thin removal method. Plasma FIB can be used to accurately bring the remaining silicon thickness to less than approximately 10 um for SEM imaging. During automatic plasma FIB delayering, an extra real-time image monitoring algorithm may be used to detect structural changes during s-prep.

The accuracy of these s-prep methods depends on the understanding of the device under test (DUT), or an IC sample. Currently, general structure analysis prior to delayering is performed using high-resolution X-ray CT imaging.

Since physical inspection for hardware assurance usually requires high quality, large area, large volume s-prep, and an undamaged ROI, the limited spatial resolution and efficiency of X-ray CT imaging becomes a limitation for accurate material removal. Also, the development of the large-scale 2.5D and 3D packaging makes the examination of X-ray CT images even more difficult and increases the difficulty in quantifying the thickness of the layer-by-layer structure inside the IC packaging.

To address these technical challenges, various embodiments provide a fast and accurate structural analysis framework to enable high quality sample preparation. Specifically, various embodiments involve the use of THz-TDS, which is an ideal modality to measure multi-layer thicknesses of an IC sample since its laser source is transparent to polymer and silicon. Beyond this, the accuracy of measurements based at least in part on the THz-TDS is very high (spatial resolution of several micrometers), thereby providing ultra-high-resolution data. Additionally, to address the generation of highly accurate 3D structures of IC packaging being unacceptably time consuming (up to several hours), various embodiments involve the efficient generation of a digital twin model of an IC sample with THz-TDS focused on selected regions of interest identified through the digital twin model.

Thus, various embodiments of the present disclosure introduce a fast, efficient, and accurate IC structural analysis framework which utilizes domain knowledge related to design information, as well as receiving, obtaining, and/or collecting digital twin data from characterization and simulation techniques. With the help of imaging processing and machine learning optimization, structural information of an IC sample can directly be used for high-accuracy sample preparation (e.g., packaging material removal) of the IC sample for physical inspection. In various embodiments, the IC structural analysis framework considers critical IC package structure parameters for high-quality s-prep, which will be discussed below in the present disclosure. In various embodiments, important depth profiles, such as the thickness of different layers and warpage of different layers, are detected by near-field THz-TDS imaging, far-field THz-TDS imaging, and/or combinations thereof. Various embodiments of the present disclosure have wide applicability across different IC samples and chips with various packaging types, such as flip-chip packaging, encapsulant packaging, or advanced 2.5D and 3D packaging.

II. EXEMPLARY OPERATIONS

As previously discussed, various embodiments described herein provide a fast, efficient, and accurate IC structural analysis framework involving hybridized imaging and generation of a digital twin model, with this IC structural analysis framework enabling high-quality sample preparation and accurate packaging material removal from IC samples. Generally, example operations of the IC structural analysis framework enable high-quality sample preparation through consideration of important and critical packaging structure parameters to sample preparation. The below lists and describes example packaging structure parameters that are critical to high-quality sample preparation, in accordance with various embodiments of the present disclosure. In various embodiments, example operations of the IC structural analysis framework are configured to determine at least some of the example packaging structure parameters discussed herein through hybridized imaging of an IC sample and generation of a DT model for the IC sample.

Encapsulant Parameters: Materials such as metal, ceramic, and polymer are frequently used as IC packaging encapsulants to protect microelectronic devices from contamination, moisture, erosion, radiation, and other environmental impacts. Knowledge of the encapsulant material helps determine the delayering strategy that can effectively remove the unwanted material during sample preparation. It is important to have the information regarding the encapsulant's thickness to de-package without damaging any component such as the lead frame and die beneath the encapsulant. FIGS. 1A-C provide optical microscope images of an IC sample after delayering of different amounts of material. Specifically, FIG. 1A illustrates an IC sample with 450 um of material removed, FIG. 1B illustrates an IC sample with 470 um material removed, and FIG. 1C illustrates an IC sample with 640 um material. Without having proper knowledge of the encapsulant's thickness, delayering of an IC sample will damage the underneath and internal components, as shown in FIG. 1C. Thus, in various embodiments, a digital twin model and/or THz-TDS data collection may characterize and/or may be used to determine a material type of packing material for an IC sample.

Lead Frame Parameters: Lead frame technology was initially used in the Dual in-Line Package (DIP) and remains a popular choice in modern package types, including Ball Grid Array package (BGA) and Quad Flat Package (QFP). Lead frames help to build the interconnection between the dies and the outside world. To deal with this integrated structure during s-prep, the lead frame's tilt angle and thickness need to be analyzed. The thickness can help locate the die's bottom layer, preventing unwanted removal of the die during the s-prep. Furthermore, some hardware assurance tests such as electrical probing require the lead frame remain undamaged during the s-prep. To accurately remove material from around the die, only having the estimated thickness of the encapsulant is not sufficient. The lead frame could become damaged during the sample preparation due to process variations such as the tilting. For example, FIG. 1B and FIG. 1C illustrate damage due to tilting, as material is unevenly removed. To remove the encapsulant without damaging the lead frame, sample preparation should be guided by the tilt angle of the lead frame of an individual IC sample. Various embodiments described herein enable the determination of lead frame parameters including tilt angle via an ultra-high-resolution digital twin model supplemented by near-field THz-TDS to thereby perform high-quality s-prep.

Die Parameters: Die thickness is also an important parameter for proper s-prep. For different types of hardware assurance, the requirements for remaining silicon thickness are different. For instance, backside photon emission measurement can be done on thicker silicon depending on the doping concentration, and SEM imaging requires ultra-thin remaining silicon. Additionally, characterization of the die curvature is needed to perform successful uniform ultra-thinning on remaining silicon substrate without damaging the DUT and ROI. To have a perfect and smooth sample free of damage, it is important in sample preparation to follow the contour of each die's precise curvature while delayering. To do so, only utilizing a one-time curvature measurement of the surface is not enough for precise ultra-thinning. This is because the die's curvature dynamically changes with material removal when the silicon substrate gets thinner. FIGS. 2A-B illustrate die curvature at different extents of material removal. Specifically, FIG. 2A illustrates die curvature of an example IC sample with roughly 30 um of remaining silicon, while FIG. 2B illustrates die curvature of the example IC sample with roughly 20 um remaining silicon. As can be seen in FIGS. 2A-B, the curvature differs for different amount of remaining silicon. The remaining silicon substrate shown in FIG. 2A is thicker and has higher curvature, while the remaining silicon substrate shown in FIG. 2B is thinner and flatter. For packaging material removal with uniform thickness during s-prep, real-time curvature measurement or a simulated curvature change during silicon thinning is needed. In various embodiments, an ultra-high-resolution digital twin model may be used to simulate curvature changes using physics-based computational software (e.g., such as Ansys or COMSOL) during material removal to prevent inadvertent removal of die material.

Thus, in various embodiments, an IC structural analysis framework involving digital twin modelling and THz-TDS data collection enables at least encapsulant material and thickness, lead frame parameters, and die parameters to be considered for high-quality sample preparation to be performed. In various embodiments, at least encapsulant material and thickness, lead frame parameters, and die parameters are determined non-destructively through the digital twin model and THz-TDS, which provides technical advantages over various destructive structure analysis methods.

With destructive structure analysis methods, IC package structure can be analyzed by sacrificing several samples. In the illustrated embodiment of FIG. 1A and FIG. 1B, the thickness of a sample encapsulant over the lead frame is approximately 450 um-470 um, which is determined based at least in part on there being 450 um of material removed in FIG. 1A and 470 um of material removed in FIG. 1B. Thus, the accuracy of the structure measurement depends on the thickness of the removed material between two layers. By overlapping images of each layer (e.g., provided by FIG. 1A and FIG. 1B respectively) together, a rough 3D structure of the packaging can be generated.

However, in destructive structure analysis methods, this material removal and analysis does not provide accurate information for other samples due to process variations among the same designs. It would also be time consuming to remove limited material and check for damage to the region of interest. That is, destructive structure analysis methods may require many sample removal routines at varying depth resolutions, while still risking damage to the ROI or IC sample (the DUT). This destructive removal and analysis is risky and time consuming and also requires expensive equipment with the depth resolution to prevent damage. In addition, for each IC sample, the thickness and tilt angle can be drastically different. Therefore, utilizing destructive methods for depth analysis upon a sacrificial sample might be different from the real DUT. Thus, the in-process destructive structure analysis is not an ideal structure analysis method for the hardware assurance.

Accordingly, various embodiments described herein provide an IC structural analysis framework which is non-destructive in extracting and analyzing structural information of an IC sample. Specifically, in various embodiments, the IC structural analysis framework may involve X-ray CT imaging and THz-TDS, which are both non-destructive, for structural analysis. Additionally and/or alternatively, in various embodiments, the IC structural analysis framework may involve employing additional imaging techniques, such as, but not limited to, using oblique CT scanning techniques and/or using various filters (e.g., wedge filters) to collect high-resolution structural information from an IC sample.

In some examples, scanning acoustic microscopy (SAM), which is another widely used non-destructive detection modality, can also be used. By collecting the reflected acoustic signals from an IC sample while immersed in a liquid, 3D internal structure can be generated. SAM has not only been used for structure characterization but also during IC packaging failure analysis, for instance detecting voids and delamination. However, the tradeoff between the accuracy and penetration depth of SAM limits its application for non-destructive and accurate IC packaging structure characterization. During highly accurate structure analysis, the acoustic signal frequency get scattered when passing through the IC packaging which make it impossible to extract entire depth profile. Thus, X-ray CT imaging and THz-TDS are optimally implemented in the IC structural analysis framework to provide high accuracy and resolution.

As discussed, X-ray CT imaging is implemented in example IC structural analysis frameworks for structural analysis to enable sample preparation. FIGS. 3A-C illustrate volumetric X-ray CT images of two IC samples with nearly identical packaging shapes, sizes, epoxy composition, and text markings. The packaging material of the IC samples depicted in FIGS. 3A-C has been isolated and removed using a histogram thresholding technique to distinguish it from the more dense and metallic lead frame and silicon die of the IC samples. By way of the histogram thresholding technique, a digitized surface mesh model of the IC sample is generated and can be used for 3D manipulation and analysis. FIG. 3A specifically illustrates the front side of an IC sample, while FIG. 3B specifically illustrates the back side of an IC sample. Meanwhile, FIG. 3C provides a perspective, three-dimensional view of an IC sample provided through X-ray CT imaging data.

With the package's volumetric X-ray data, each layer's thickness and tilt angle can be measured. However, just like destructive structural analysis, measurement accuracy is highly dependent on the resolution of the X-ray image. High-resolution X-ray CT requires the IC sample or DUT to be exposed to X-ray beams for extended durations. Long time exposure under high energy X-rays may also damage the DUT. Additionally, different materials inside the packaging have various X-ray attenuations and absorption, which causes some critical information to be deteriorated or lost during collection, post-processing, or further layer segmentation. Geometric trajectories, such as X-ray computed laminography (CL) imaging, enable higher fidelity data gathering from flat DUTs, such as ICs, to reveal small features such as bond wires and dies. However, such details are revealed by X-ray CL imaging at the cost of layer information and efficiency, as the source and detector distance is brought closer to the sample.

To overcome some limitations of X-ray CT imaging applied in non-destructive structural analysis of an IC sample, various embodiments may perform THz-TDS to form a non-destructive structural analysis. THz-TDS can generate structural information by measuring the thickness of different layers. Since the packaging material is transparent to the THz beam, the time delay ($\Delta T$) and intensity of the THz beam can be recorded. The thickness (d) of different layers can be calculated based at least in part on the signal time delay ($\Delta T$). Equation 1 below specifically demonstrates determination of thickness $d_i$ of a layer i using THz-TDS imaging. In Equation 1, $n_i$ represents the reflection index of a layer i, c represents the velocity of light, and $\Delta T$ represents the signal time delay. Thus, THz-TDS and other example laser-based inspection techniques can address the problems of reaching the limits of inspection resolution for 3D integration by obtaining more accurate structural information than is possible with X-ray CT. Additionally, however, it should be noted that in various embodiments, X-ray CT imaging data can be used to estimate structural information such as IC sample thickness and composition, where the estimated structural information can be used to further refine the refractive index calculation of the THz-TDS data.

$$d_i = \frac{c\Delta T}{2n_i} \qquad \text{Equation 1}$$

In various embodiments, the IC structural analysis framework involves performing near-field THz-TDS, far-field THz-TDS, and/or a combination thereof. In one example, IC samples can be scanned using the THz near-field scanning system TeraCube from Protemics to collect high resolution Terahertz data with a photo-conductive microprobe. Generally, near-field THz-TDS can achieve an imaging resolution of 100 um using reflection modes. In various embodiments, the image is collected by raster scanning the micro-probe across the sample and mapping pixel by pixel intensity information. Then, a 2D image of the specific layer from the device can be extracted from the combined single pixel detection.

FIGS. 4A-C illustrate THz-TDS reconstructive images from different layers of an IC sample, thereby illustrating different layer morphology. Analysis of time delays in the intensity signal yields depth information which can used to develop a 3D structure of the DUT.

However, mapping the entire volume of one DUT with near-field THz-TDS as shown here may require several hours, in some examples, which is an excessive time frame for single component hardware assurance detection. Beyond this, THz single interference and diffraction may cause noise and scattering in image quality. Alternative modalities of THz-TDS signal reconstruction for improved accuracy and image quality include: THz diffraction tomography (THz-DT), THz computed tomography (THz-CT), THz binary lens tomography, and THz digital holography, which can be used to achieve high-resolution 3D structure. Although resolution enhancement techniques and image reconstruction approaches can be used for high accuracy structure reconstruction, these THz methods are limited by the THz-TDS detection efficiency.

Thus, in various embodiments, the IC structural analysis framework comprises generating a digital twin model of the IC sample, which is more efficient than mapping the entire volume of the IC sample using near-field THz-TDS, and in various embodiments, near-field THz-TDS is focused on selected regions of interest within the digital twin model. There is no need to extract highly accurate information from all three dimensions for some forms of structural analysis. During structural analysis for high-quality s-prep, the dimensional tolerance of the measurement in the X-Y plane is much higher than in the Z-axis. As a result, there is no need for complete mapping (for THz) and/or 3D image reconstruction (for X-ray) of the 3D structure of DUT, which is very time consuming.

Furthermore, the majority of structure data is repetitive due to the symmetry of the IC packaging, even for Z-axis information. Hence, detailed data collection over the entire sample is superfluous. In various embodiments, a customized digital twin (DT) model of the IC sample is generated to improve the efficiency of structural analysis with the same level of information and accuracy. Specifically, a DT model of the IC sample is generated to provide high tolerance structural information. The DT model of the IC sample may then be supplemented with near-field THz-TDS, which is used to detect low tolerance structure information which is most critical for the high quality s-prep. Accordingly, various embodiments involve multi-modality analysis for practical and accurate structure detection.

In various embodiments, a DT model virtually represents and describes the internal structure of a corresponding IC sample. In one example embodiment, the DT model may be manifested or embodied as a computer aided design (CAD) file. Additionally and/or alternatively, in one or more embodiments, the DT model can be manifested or embodied as a digitized surface mesh model. FIG. 5 generally illustrates example operations for IC inspection and structure analysis using the DT model of an IC sample and THz-TDS. As shown in Step 1 of FIG. 5, the DT model of the IC packaging comprises the general structure information, including the component type, horizontal location, and vertical location of each component, for example. In various embodiments, the DT model may be configured to describe the refractive index of epoxy material and the silicon wafer, which will be used to calculate each layer's thickness. The DT model and the structural information described by the DT model can be generated, in various embodiments, based at least in part on in-process destructive structural analysis or non-destructive detection, such as X-ray CT imaging. In particular, the DT model and the structural information are generated with lower resolution with fewer detection angles, thereby minimizing damage done to the IC sample through X-ray CT imaging. In one example embodiment, the DT model is generated based at least in part on directly converting the X-ray CT output structure into a CAD file with image processing. Critically, one DT model may be generated and defined for a class of similar IC samples. Thus, structural information detection and DT model generation can be performed less frequently, and a DT model can be reused when analyzing similar IC samples. Furthermore, the CAD file can be used to convert the structural information into design information which can be imported into various electronic design automation (EDA) software applications.

Because of process variations such as molding thickness and die curvature between individual IC samples, the digital twin model alone cannot directly be used for s-prep. However, by loading real thickness information from highly accurate structure analysis methods, the DT model can be supplemented with a real 3D structure of the IC sample to provide structural information with requisite accuracy for high quality s-prep. In contrast with SAM, THz-TDS does not involve immersion of IC samples into liquid and can also achieve high resolution and high penetration simultaneously. In addition, a low energy inferred laser is used as the source of the THz-TDS, in various embodiments, which will reduce damage to the IC sample even with a long duration (in contrast with X-ray imaging). Moreover, owing to the short wavelength of the source of the THz-TDS, it provides a higher resolution than the microwaves and radio waves. As a result, THz-TDS is an ideal method for thickness measurement to supplement the DT model.

As shown in FIG. 5, due to the package structure's axial symmetry, only a few THz-TDS signals need to be collected to gain sufficient knowledge of the IC sample's 3D structure for high-quality s-prep. First, at Step 1 and Step 2, the THz-TDS data is extracted from selected points and/or regions of the IC package. Such points and/or regions can be identified based at least in part on user input, in some examples. In the illustrated embodiment of FIG. 5, various points of the DT model are indicated via "X" indicators, and as discussed, these points marked by "X" indicators may be defined based at least in part on user input. Each point may be associated with a corresponding position (e.g., "P1", "P2") for THz-TDS data collection.

Depending on a requisite or threshold structure accuracy for s-prep, the number of selected THz-TDS target points can be modified. For instance, a user may be prompted to select a certain number of points of the IC sample. In some example embodiments, various points and/or regions of the IC sample may be automatically selected based at least in part on requirements associated with s-prep. In another example embodiment, various points and/or regions of the IC sample may be automatically selected based at least in part on the data of the DT model (e.g., the volume of data available for certain regions, the resolution of data at certain points).

Next, varying reflective indexes of various sample materials will boost layer resolution by varying the THz signal's time-of-flight (Step 3). With the help of Equation 1, the thickness of epoxy and die can be calculated. In various embodiments, the reflective indexes of the sample materials may be described by and extracted from the DT model. Then, by loading this high-accuracy thickness information determined through THz-TDS, the digital twin model of the IC sample may be supplemented to form a highly accurate 3D structure of the sample (Step 4). As illustrated in FIG. 5, addition of data collected from THz-TDS that is specific to selected regions of interest to the DT model may be performed repeatedly. That is, after Step 4, additional points and/or regions of interest may be selected, and THz-TDS data may be collected for these additional points and/or regions of interest.

Referring now to FIG. 6, a flowchart is provided to described additional detail regarding example operations of an IC structural analysis framework. In various embodiments, the IC structural analysis framework first comprises a preview scan or inspection of an IC sample, as illustrated at point #1 of FIG. 6. The preview inspection of the IC sample may use rapid imaging modalities, such as laser-based imaging or optical imaging. Generally, the imaging modalities used in the preview inspection of the IC sample may be faster than THz signal acquisition for THz-TDS. The primary purpose of preview inspection of the IC sample is to rapidly identify whether a similar device design exists and has been previously inspected for the IC sample based upon shape, markings, or type of the IC sample. That is, the preview inspection of the IC sample may specifically identify rapidly-identifiable features of the present IC sample and compare such identified features with previously-extracted features of previously inspected IC designs and/or samples. In some examples, the previously-extracted features may be stored in a database, in volatile and/or non-volatile memory of a computing entity performing the example operations of the IC structural analysis framework, and/or the like. Specifically, the rapidly-identifiable features of the IC sample that are identified through the previous inspection may include any exterior defects, artifacts, or features that might correspond to previously inspected devices.

Thus, in various embodiments, performing the preview inspection of the IC sample (at point #1) comprises identifying a plurality of features of the IC sample, including a logo, text, surface damage, a number of pins, a size approximation, an overall thickness approximation, and morphology. The identifying features of the IC sample may then be cross-referenced to previously inspected IC designs of different IC samples and/or to previously inspected IC samples.

As illustrated in FIG. 6, in accordance with a determination that a similar IC design or sample has not been previously inspected, high-resolution data may be collected and a digital twin model for the IC sample may be generated at point #2 of FIG. 6. Here, it is necessary to characterize the internal structure of the IC sample with sufficient resolution to detect the size of the smallest feature size. In various embodiments, data for DT model generation is collected non-destructively, for example through tomographic collection via THz signals, X-ray, acoustic beams, ultrasonic beams, and/or the like. Thus, high-resolution data collection is used to non-destructively characterize a sample and create a digital twin model of the IC sample or DUT. Further, in various embodiments, the digital twin model of an IC sample enables a user to view and manipulate the internal features of the IC sample to define a region of interest for further analysis. In addition, this digital twin model can be used for performing Monte Carlo-based simulation to determine the optimal inspection routine for other IC samples of similar character.

Here, high-resolution volumetric data collection can detect grossly anomalous samples such as counterfeits, environmental exposure, or defects. That is, a preliminary inspection and hardware assurance may be performed at point #2 with the high-resolution data collection. However, ultra-high-resolution data is required to perform precise sample preparation because IC features are on the order of nanometers and microns. Because of unique process variations between individual ICs of the same design, a high-resolution digital model alone cannot directly be used for automated sample preparation, as previously discussed.

Otherwise, in accordance with a determination that a similar IC design or sample has been previously inspected, previously collected high-resolution data may be queried and retrieved (e.g., from a database, from memory) to generate a DT model, and/or a previously-generated DT model may be queried and retrieved.

Subsequently, a user may select one or more regions of interest (ROIs) within the digital twin model (e.g., generated at point #2, retrieved from a database, retrieved from memory) in order to perform sample preparation and material removal specific to a section of an IC die or leadframe. The volumetric high-resolution digital twin model is algorithmically analyzed to derive critical features such as thickness information within the one or more ROIs selected by the user. This user input ROI selection informs the inspection settings and pattern for near-field THz-TDS collection. Additionally and/or alternatively, the selection of one or more ROIs can be automated and the one or more ROIs can be determined based at least in part on feedback analyzed from similar samples. The optimization of the THz-TDS data collection enables faster scan time by isolating the volume to be analyzed to just the area needed for sample preparation determination, as opposed to a time-consuming THz-TDS data collection for the entire volume of the IC sample. Specifically, each ROI selected by a user may be defined by X, Y, and Z locations within 3D volumetric data, and the desired sampling resolution of THz acquisition in spatial and frequency regimes may also be defined. The ROI can be a specific failure in the design identified with volumetric methods, circuit failure detected with time-domain reflectometry (TDR), or through Technology CAD (TCAD) simulation, quantum diamond microscope (QDM) magnetic field imaging, magnetic resonance, etc.

Due to the package structure's axial symmetry, only a minimal attenuation from THz-TDS signal is necessary to characterize an IC sample's 3D structure. For flat components, such as lead frame and encapsulant, only four points of measurement may be needed, in some examples. For curved components (e.g., an IC die), at least five points of measurement may be required to generate the real die curvature. Comparing with the volumetric structure analysis, this DT-aided structure analysis enables high-throughput inspection and is thus suitable for the s-prep for hardware assurance purposes.

Thus, at point #3 in FIG. 6, THz-TDS data collection is performed upon the IC sample non-destructively for the one or more ROIs, and THz-TDS data collection is used to generate an ultra-high-resolution 3D structure of the IC sample to be used for further automated s-prep determination. For example, the ultra-high-resolution THz-TDS data (e.g., thickness information) is used to supplement the high-resolution data of the DT model. THz-TDS enables highly accurate spatial and compositional resolution, specifically the layer thickness and chemical structure. The combination of both global tomographic volumetric data from the DT model and localized and ultra-high-resolution THz-TDS data reduces the amount of false positives that can cause errors for automated processes or during user ROI selection.

At point #4 in FIG. 6, various features are extracted from the ultra-high-resolution supplemented DT model. These features can be used to characterize the IC sample, enabling the present IC sample and corresponding DT model to be used for new IC samples that are similar to the present IC sample (determined via comparison of the extracted features).

Specifically, features of interest are extracted during iterative reconstruction of the THz-TDS data. During iterative reconstruction, features of interest are extracted simultaneously for comparison across different iterations. In some examples, if a feature of interest is no longer improving in resolution, the iterative loop will complete. Similarly, iterative reconstructive will complete once the spatial and spectral resolution of the data reaches a set threshold, which may be defined according to s-prep requirements. If these example stopping criteria are not reached, collection of high-resolution data for DT model generation (point #2) and collection of ultra-high-resolution data through THz-TDS (point #3) may be repeated to enable feature extraction to continue.

Generally, the extracted features may include internal features that include thickness, composition, and phase of the epoxy packaging material that must be removed. Other internal features may include orientation relative to the packaging, crystallographic alignment, curvature of the silicon die of the IC sample, and/or the like, etc. These internal features can be extracted from 2D x-ray imaging (point #2) and/or the ultra-high-resolution THz-TDS (point #3). Meanwhile, other features can be extracted from the preview inspection performed at point #2. Such features extracted from the preview inspection may primarily be external features of the IC sample. With the help of computer vision, external features such as surface texture, logo, scale and pin numbers will be collected.

With these extracted features, the IC sample can be characterized, thereby enabling different IC samples to be compared generally, as previously discussed. In some embodiments, various features and material information may be stored as a datasheet and can be used to further improve accuracy in further IC samples. In various embodiments, a database may be generated to store extracted features for different IC samples. Structural features, such as shape and scales, are visualized with the digital twin model and enable selection of material removal region and depth during s-prep.

Thus, at point #4, extraction of critical features from the IC structure are required to determine the proper sample preparation pattern, which can be performed automatically with the extracted features being provided as outputs. These features could be the size and the material of the die, thickness or composition of packaging, the density, and/or the like. Thus, accurate definition and extraction of features enables development of the sample preparation recipe for automated removal of material.

At point #5 in FIG. 6, after the extraction of features, finite element analysis (FEA) may be performed upon the ultra-high-resolution or supplemented DT model to determine and/or predict the effects of sample preparation upon the general packaging structure using historical trials of previous material removal attempts on similar packaging compositions. In some example embodiments, the historical trials of previous material removal attempts on similar packaging compositions and results thereof may be retrieved from a database. As previously discussed, the curvature of the die can change dynamically with the decreasing thickness during material removal, and thus, FEA enables the determination of the automatic s-prep routine that does not require any real-time curvature monitoring and/or image processing.

Although this methodology is based upon hybrid metrology for volumetric data collection, a digital twin model of ultra-high-resolution can be generated with analog methods such as those described or through digital means such as a computer aided design (CAD). Design information or manufacturing domain data and simulation can be used to model a device for automated s-prep. IC packaging types of the same design share many similarities, and the ultra-high-resolution collection from a similar sample can be used to inform THz data collection, digital twin reconstruction, and automated material removal of a similar package.

An aggregator block combines the FEA simulation of the expected sample preparation effects and optimal removal pattern with historical data of prior sample-preparation attempts on similar packaging designs, compositions, or ROIs. In various embodiments, the material removal algorithm inputs the aggregator block data with the available sample-preparation tool with automated scripting capabilities. The algorithm exports the necessary recipe for the material removal tool to automatically interact with the DUT without user input. Sample preparation is performed following the recipe/pattern, followed by SEM Detection to determine if the removal was successful. Image processing is performed upon the collected Scanning Electron Microscopy (SEM) data to automatically determine the next steps for material removal, and improve future material removal predictions.

If it is determined through image processing of the SEM data that material removal was successful, then an indication that sample preparation has been completed may be provided. Further, focused ion beam methods may be used to remove a final remaining amount of material which cannot be removed using mechanical methods. Otherwise, if SEM image processing does not meet the threshold, more material is mechanically removed, as guided by the material removal algorithm, as FIB techniques are costly compared to mechanical methods. The material removal algorithm is repeated, however it can now recalculate with the new SEM data, which may be topographic, compositional, and/or spectrographic, to optimize the final mechanical removal.

By combining the digital twin model and highly accurate THz-TDS, various embodiments provide an IC structural analysis framework that is non-destructive, efficient, and accurate. Through this IC structural analysis framework, a very high quality s-prep can be achieved. An overview of the integration of IC structural analysis framework with sample preparation is shown in FIG. 7. FIG. 7 specifically shows generation of a digital twin model, supplementing the digital twin model with thickness measurements from THz-TDS, and using the ultra-high-resolution and supplemented digital twin model to guide a milling drill for material removal. For hardware assurance, this structure informal can help improve the efficiency of different types of non-destructive physical inspection for understanding the structure of the IC. The accuracy of the structure can be customized based at least in part on the application information and without any overkill. For instance, structure analysis for the s-perp requires high accurate z-axis information. By using this method, measurement resources such as time, energy, and workforce, will be saved.

Owing to the fabrication variations, the reflective index of material is different from IC sample to IC sample. To improve the accuracy of structural measurements, the reflection of each IC sample should be measured. Instead of using the repeated or generic information from a digital twin model, the reflective index of each sample can be measured by a Terahertz-Time-of-Flight-System (THz-TFS), which adopts the transmission and reflection THz-TDS at the same time. In the time domain spectrum (FIG. 6 Data loading), the peak is hard to differentiate which is due to the noise arising from the signal diffraction by layers and impurities. By adopting the sparse deconvolution, the high resolution of multilayered structure analysis can be achieved for the highly accurate structure analysis purposes. DT can dramatically increase the efficiency for several forms of hardware assurance analysis. However, it can also be a potential threat for electronic devices. First, the information inside the DT of the IC packaging can simplify the reverse engineering process. Furthermore, the DT can help the adversary locate a target attack location. Due to the importance of the DT to hardware security, the IP owners and foundries should develop novel protection methods to prevent the DT from being extracted, copied, or stolen by malicious entities. Hence, the DT information should be encrypted and stored in a safe location. Additionally and/or alternatively, in various embodiments, compressive imaging techniques can be employed to greatly decrease the data collection time necessary for performing THz-TDS imaging on an IC sample. For instance, it is possible to render a DT model with good approximation by performing only a fraction of the required measurements by using compressive imaging algorithms.

III. COMPUTER PROGRAM PRODUCTS, SYSTEMS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY COMPUTING ENTITY

FIG. 8 provides a schematic of an exemplary computing entity 800 that may be used in accordance with various embodiments of the present disclosure. For instance, the computing entity 800 may be a device configured to perform example operations of an IC structural analysis framework involving hybridized imaging and DT model generation, in accordance with various embodiments of the present disclosure. In general, the terms computing entity, entity, device, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the field should appreciate that the computing entity 800 shown in FIG. 8 may be embodied as a plurality of computing entities, tools, and/or the like operating collectively to perform one or more processes, methods, and/or steps. As just one non-limiting example, the computing entity 800 may comprise a plurality of individual data tools, each of which may perform specified tasks and/or processes.

Depending on the embodiment, the computing entity 800 may include one or more network and/or communications interfaces 820 for communicating with various computing entities, such as by communicating data, content, information, and/or similar terms used herein interchangeably that can be transmitted, received, operated on, processed, displayed, stored, and/or the like. Thus, in certain embodiments, the computing entity 800 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 800 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 800 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 800 includes or is in communication with one or more processing elements 805 (also referred to as processors, processing circuitry, and/or similar terms used herein interchangeably) that communicate with other elements within the computing entity 800 via a bus, for example, or network connection. As will be understood, the processing element 805 may be embodied in several different ways. For example, the processing element 805 may be embodied as one or more complex programmable logic devices (CPLDs), microprocessors, multi-core processors, coprocessing entities, application-specific instruction-set processors (ASIPs), and/or controllers. Further, the processing element 805 may be embodied as one or more other processing devices or circuitry. The term circuitry may refer to an entirely hardware embodiment or a combination of hardware and computer program products. Thus, the processing element 805 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 805 may be configured for a particular use or configured to execute instructions stored in volatile or non-volatile media or otherwise accessible to the processing element 805. As such, whether configured by hardware, computer program products, or a combination thereof, the processing element 805 may be capable of performing steps or operations according to embodiments of the present disclosure when configured accordingly.

In various embodiments, the computing entity 800 may include or be in communication with non-volatile media (also referred to as non-volatile storage, memory, memory storage, memory circuitry and/or similar terms used herein interchangeably). For instance, the non-volatile storage or memory may include one or more non-volatile storage or non-volatile memory media 810 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or non-volatile memory media 810 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the non-volatile memory media 810 may also be embodied as a data storage device or devices, as a separate database server or servers, or as a combination of data storage devices and separate database servers. Further, in some embodiments, the non-volatile memory media 810 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 800 may further include or be in communication with volatile media (also referred to as volatile storage, memory, memory storage, memory circuitry and/or similar terms used herein interchangeably). For instance, the volatile storage or memory may also include one or more volatile storage or volatile memory media 815 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In particular, volatile storage or volatile memory media 815 of the computing entity 800 includes the cache or cache memory, which may be exploited in unauthorized memory access cyberattacks to reveal information stored in private, concealed, restricted, and/or the like portions of the non-volatile storage or non-volatile memory media 810.

As will be recognized, the volatile storage or volatile memory media 815 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 805. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 800 with the assistance of the processing element 805 and operating system.

As will be appreciated, one or more of the computing entity's components may be located remotely from other computing entity components, such as in a distributed system. Furthermore, one or more of the components may be aggregated, and additional components performing functions described herein may be included in the computing entity 800. Thus, the computing entity 800 can be adapted to accommodate a variety of needs and circumstances.

V. CONCLUSION

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A method for analyzing a three-dimensional structure of an integrated circuit (IC) sample, the method comprising:
   performing, using one or more imaging modalities, a preview scan of the IC sample to identify a plurality of features of the IC sample;
   determining, based on the plurality of features of the IC sample, whether a similar design of the IC sample exists in a data store indicating that the similar design of the IC sample has been previously inspected;
   responsive to determining that a similar design of the IC sample does not exist in the data store, generating a digital twin model for the IC sample, wherein the digital twin model comprises data characterizing an internal structure of the IC sample, wherein the data is collected in a non-destructive manner;
   receiving an indication of one or more regions of interest of the digital twin model;
   generating thickness information specific to each region of interest using near-field terahertz-time-domain-spectroscopy (THz-TDS) data collection that is different from the preview scan;
   supplementing the digital twin model with the thickness information specific to each region of interest; and
   performing automatic sample preparation of the IC sample using the supplemented digital twin model.

2. The method of claim 1, wherein the digital twin model comprises data collected at a previous instance for a second IC sample having features determined to be similar to one or more features of the IC sample.

3. The method of claim 1, wherein receiving the digital twin model of the IC sample comprises collecting data of the internal structure of the IC sample using at least one of X-ray computed tomography (CT) imaging or X-ray computed laminography (CL) imaging techniques.

4. The method of claim 1, wherein the indication of one or more regions of interest is received based at least in part on receiving user input responsive to providing the digital twin model for display.

5. The method of claim 1, wherein performing automatic sample preparation of the IC sample using the digital twin model comprises performing finite element analysis and a material removal algorithm.

6. A system for analyzing a three-dimensional structure of an integrated circuit (IC) sample, the system comprising one or more processors, a memory, and one or more programs stored in the memory, the one or more programs comprising instructions configured to:
   perform, using one or more imaging modalities, a preview scan of the IC sample to identify a plurality of features of the IC sample;
   determine, based on the plurality of features of the IC sample, whether a similar design of the IC sample exists in a data store indicating that the similar design of the IC sample has been previously inspected;
   responsive to determining that a similar design of the IC sample does not exist in the data store, generate a digital twin model for the IC sample, wherein the digital twin model comprises data characterizing an internal structure of the IC sample, wherein the data is collected in a non-destructive manner;
   receive an indication of one or more regions of interest of the digital twin model;

generate thickness information specific to each region of interest using near-field terahertz-time-domain-spectroscopy (THz-TDS) data collection that is different from the preview scan;

supplement the digital twin model with the thickness information specific to each region of interest; and perform automatic sample preparation of the IC sample using the supplemented digital twin model.

7. The system of claim 6, wherein the digital twin model comprises data collected at a previous instance for a second IC sample having features determined to be similar to one or more features of the IC sample.

8. The system of claim 6, wherein the one or more programs configured to receive the digital twin model of the IC sample further comprise instructions to collect data of the internal structure of the IC sample using at least one of X-ray computed tomography (CT) imaging or X-ray computed laminography (CL) imaging techniques.

9. The system of claim 6, wherein the indication of one or more regions of interest is received based at least in part on receiving user input responsive to providing the digital twin model for display.

10. The system of claim 6, wherein the one or more programs configured to perform automatic sample preparation of the IC sample using the digital twin model further comprise instructions to perform finite element analysis and a material removal algorithm.

11. A computer program product for analyzing a three-dimensional structure of an integrated circuit (IC) sample, the computer program product comprising at least one non-transitory computer-readable storage medium having program instructions embodied thereon, the program instructions executable by a processor to cause the processor to:

perform, using one or more imaging modalities, a preview scan of the IC sample to identify a plurality of features of the IC sample;

determine, based on the plurality of features of the IC sample, whether a similar design of the IC sample exists in a data store indicating that the similar design of the IC sample has been previously inspected;

responsive to determining that a similar design of the IC sample does not exist in the data store, generate a digital twin model for the IC sample, wherein the digital twin model comprises data characterizing an internal structure of the IC sample, wherein the data is collected in a non-destructive manner;

receive an indication of one or more regions of interest of the digital twin model;

generate thickness information specific to each region of interest using near-field terahertz-time-domain-spectroscopy (THz-TDS) data collection that is different from the preview scan;

supplement the digital twin model with the thickness information specific to each region of interest; and perform automatic sample preparation of the IC sample using the supplemented digital twin model.

12. The computer program product of claim 11, wherein the digital twin model comprises data collected at a previous instance for a second IC sample having features determined to be similar to one or more features of the IC sample.

13. The computer program product of claim 11, wherein the program instructions configured to receive the digital twin model of the IC sample further comprise instructions to collect data of the internal structure of the IC sample using at least one of X-ray computed tomography (CT) imaging or X-ray computed laminography (CL) imaging techniques.

14. The computer program product of claim 11, wherein the indication of one or more regions of interest is received based at least in part on receiving user input responsive to providing the digital twin model for display.

15. The computer program product of claim 11, wherein the program instructions configured to perform automatic sample preparation of the IC sample using the digital twin model further cause the processor to perform finite element analysis and a material removal algorithm.

\* \* \* \* \*